Feb. 16, 1954   J. SEVERANCE   2,669,173
ROTARY CULTIVATOR
Filed Nov. 14, 1947   2 Sheets-Sheet 2
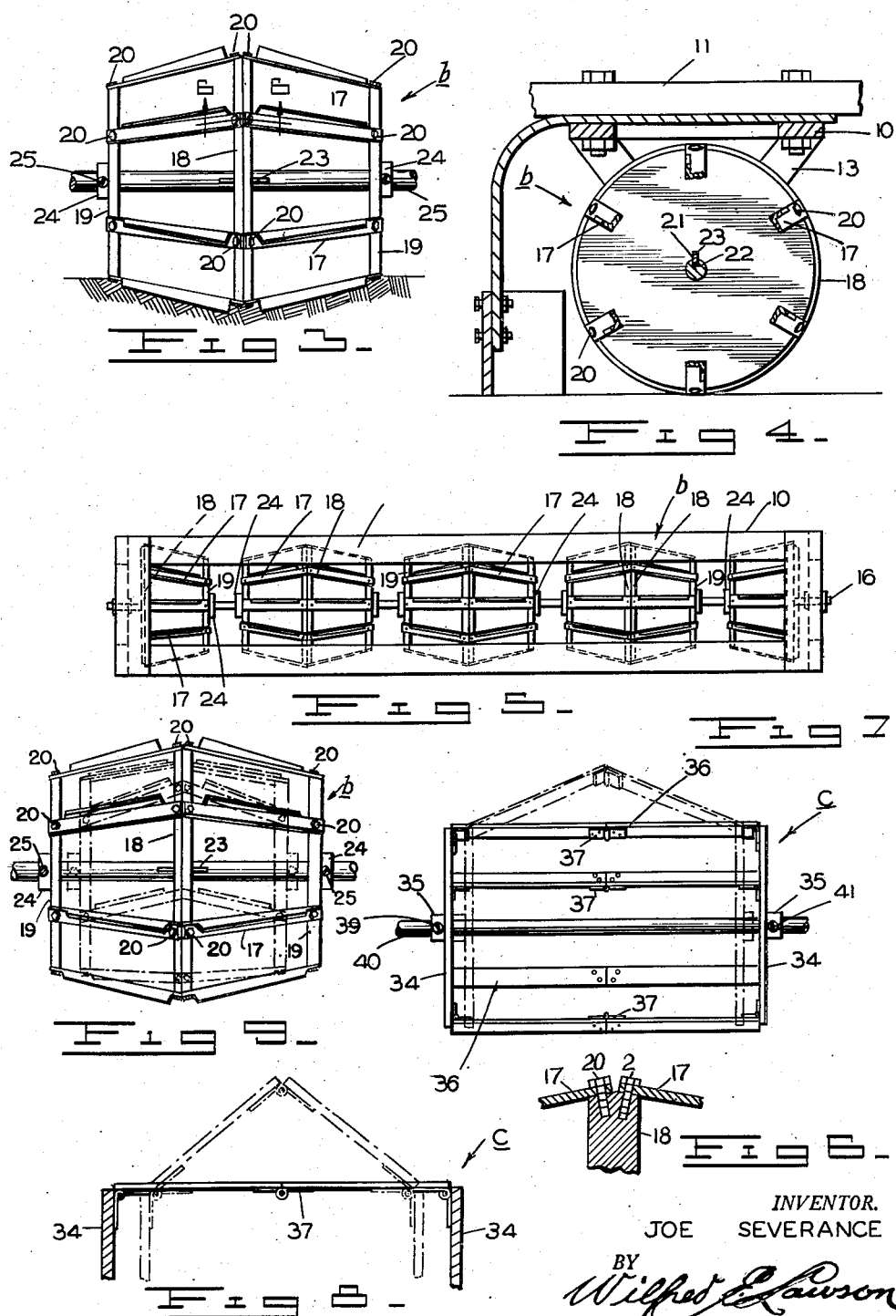
INVENTOR.
JOE SEVERANCE
BY Wilfred E. Lawson
ATTORNEY Patented Feb. 16, 1954

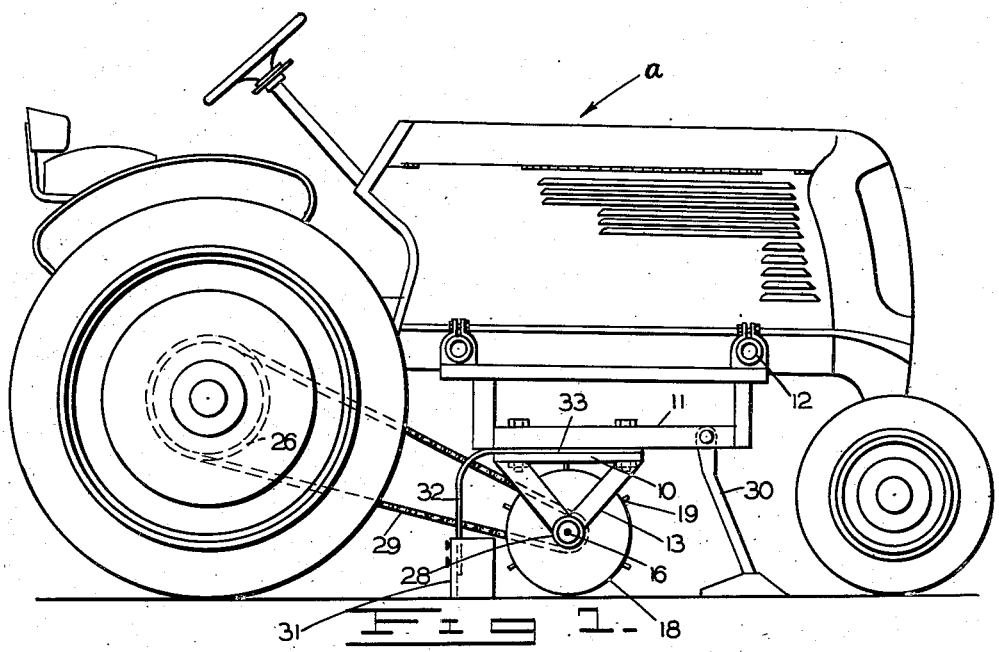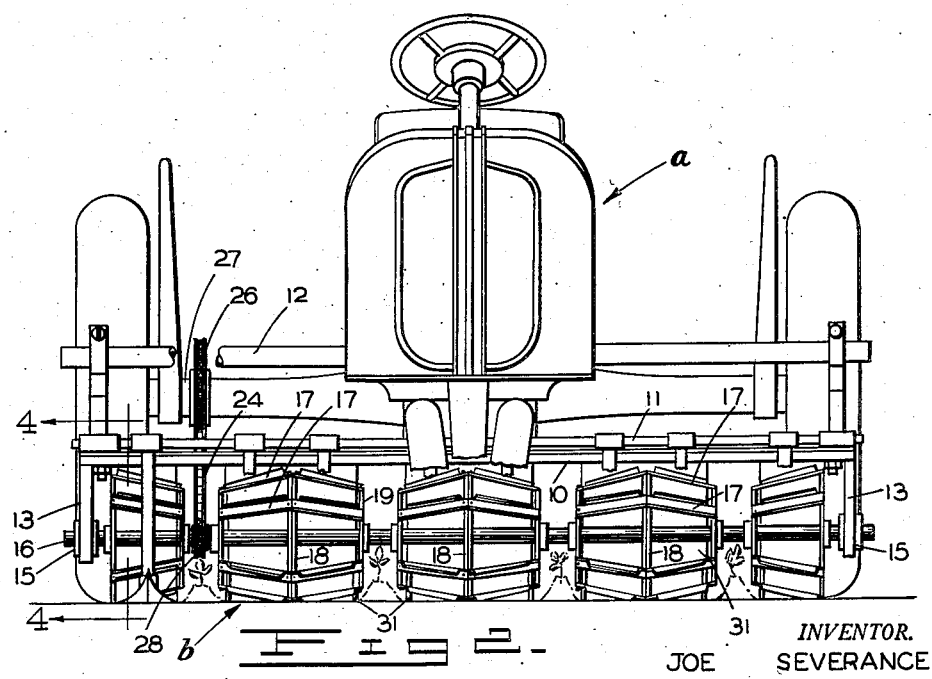

2,669,173

UNITED STATES PATENT OFFICE 2,669,173

ROTARY CULTIVATOR

Joe Severance, Eden, Idaho, assignor of one-half to Robert C. Chattin, Boise, Idaho Application November 14, 1947, Serial No. 786,031

1 Claim. (Cl. 97—215)

My invention relates to agricultural machinery and more particularly to a mulching appliance.

The object of my invention is to provide a mulching appliance adapted to be removably attached directly to a tractor or to the frame of a cultivator secured on a tractor.

Another object of my invention is to provide a mulching appliance of the character indicated above having a plurality of sets of mulching blades mounted on a common rotatably supported shaft extending transversely of the tractor, the several sets of mulching blades being arranged in spaced relation to each other to straddle the rows of beans or the like to be cultivated.

A further object of my invention is to provide a mulching appliance of the character indicated above, the blades of the several sets of which are adapted to break up lumps of wet ground and the like into fine particles and to move said particles to cover and kill the weeds in the rows of beans and the like to be cultivated.

A still further object of my invention is to provide a mulching appliance of the character indicated above, the blades of each set of which are adapted to be adjusted, so that seed rows planted at narrower or wider distance from each other may be cultivated with the mulching device according to my invention.

Other objects of the present invention not specifically mentioned may appear in the following specification describing my invention with reference to the accompanying drawings illustrating preferred embodiments of my invention.

It is however to be understood that my invention is not to be limited or restricted to the exact construction and combination of parts described in the specification and shown in the drawings, but that such changes and modifications can be made, which fall within the scope of the claim appended hereto.

In the several figures of the drawings similar parts are indicated by similar reference characters and wherein:

Figure 1 is an elevational side view of a tractor equipped with a mulching device according to my invention.

Figure 2 is an elevational front view of Figure 1, parts being broken away to show the mulching device according to my invention.

Figure 3 is an elevational front view of two adjacent sets of mulching blades mounted on the common drive shaft.

Figure 4 is a sectional view taken on line 4—4 in Figure 2.

Figure 5 is a top plan view of the assembled sets of mulching blades on the common shaft and the frame supporting the assembly.

Figure 6 is a sectional view taken on line 6—6 of Figure 3.

Figure 7 is a top plan view of a modified form of two sets of mulching blades.

Figure 8 is a sectional detail view of Figure 7, and

Figure 9 is an elevational front view of two adjacent sets of mulching blades mounted on the common drive shaft, similar to Figure 3 but showing in broken lines the device in an adjusted position.

The mulching device forming the subject matter of my invention comprises an elongated rectangular frame 10 detachably secured to a cultivator frame 11 removably attached to a portion 12 of the frame of a tractor $a$.

A bearing frame 13 is secured to and extends downwardly from each transverse end member of the frame 10 and on the lower end of each bearing frame 13 a roller bearing 15 or the like is provided, in which a transverse shaft 16 is rotatably arranged. This shaft extends over the entire length of the elongated rectangular frame 10.

A plurality of sets $b$ of mulching blades 17 is adjustably secured onto the common shaft 16, and each set $b$ of mulching blades 17 consists of an inner disk 18, two outer disks 19, and a plurality of mulching blades 17 pivotally mounted on the inner and outer disks 18 and 19 respectively. The diameter of the inner disks is larger than the diameter of the outer disks. The edge of the inner disk is beveled toward both sides, and the edges of each outer disk are beveled to incline outwardly and at such angles that the mulching blades 17 lie flatly on the circumferential edge surfaces of the disks when a set $b$ is assembled by securing each blade 17 on the disks by bolts 20 extending through the blade adjacent the ends thereof and engaging the disks by entering them from their edge. The blades are arranged at equal distances from each other around the disks. Each inner disk 18 is provided with a key-way 21 and a plurality of corresponding key-ways 22 is arranged in the common shaft 16 at desired predetermined distances from each other. The inner disks 18 are mounted on the common shaft by driving a key 23 into the key-way 22 of the shaft and the key-ways 21. Each outer disk 19 has a centrally located outwardly extending hub 24 thereon and the common shaft 16 extends centrally through said disks and their hubs. Each outer disk is secured in position on the common shaft 16 by a heavy set screw 25 in the corresponding hub 24, engaging the shaft. The distance between the inner and the outer disk of each mulching blade set b may be adjusted by loosening the set screws 25 and rotating the outer disks 19 in the same direction, so that the mulching blades 17 are pivoted about the bolts 20, shortening or lengthening the distance between the inner and outer disks of each set b and adjusting the distance between the outer disks of adjacent sets b. As shown in the drawing on each end of the common shaft 16 a half of a mulching blade set b is mounted, so that the larger inner disk 18 is located on the outside of the set and the blades 17 of these sets slant inwardly.

A comparatively large sprocket gear 26 is rigidly mounted on the rear axle 27 of the tractor a and a comparatively small sprocket gear 28 is rigidly mounted on the common shaft 16. A sprocket chain 29 is trained over these two sprocket gears. The common shaft 16 and the sets b of the mulching blades 17 are driven by the tractor a through this sprocket transmission. The width of the mulching blade sets b are adjusted as described above so that the several sets straddle the rows of beans or other planted seeds to be cultivated.

When the tractor a is driven, conventional cultivator tools 30 secured on the cultivator frame 11 operate in the usual manner, and the sets b of mulching blades 17 are rotated at a comparatively high speed, so that they break up clods of dirt or the like. The arrangement of the blades enables the latter to urge the broken up dirt laterally from the inner disks 18 of said sets toward the plant rows between them to cover and kill any weeds starting to grow there.

A U-shaped scraper 31 is secured to the vertical leg 32 of an angularly bent bracket plate 33 secured between the cultivator frame 11 and the elongated rectangular frame 10, supporting the mulching blade sets b. There is one scraper 31 for every set of mulching blades, and these scrapers are arranged so that they follow the mulching blades and smooth the ground behind them. In this manner the field is left in a smooth clean condition between the seed rows, and the single mulching blade sets b on the sides of the frame 10 work one half of the space adjacent to the outer cultivated seeded rows. The other half of this space is worked during the return trip of the tractor a.

In Figures 7 and 8 a modified form of the mulching blade set is illustrated. This set c comprises two end disks 34. Each end disk is provided with a centrally located, outwardly extending hub 35. Each mulching blade 36 of this set c consists of two halves abutting each other and connected with each other by means of hinge 37. Adjacent the free end of each blade half, another hinge is mounted with one of its free ends secured to the inside surface of one of the disks 34. The blades are mounted in this manner on said disks at equal distances from each other. Each disk 34 is provided with a central opening 39 extending through the disk and the hub 35 thereon. The assembled mulching blade sets c are mounted on a common shaft 40, equivalent to the above described common shaft 16, and are secured thereon by means of set screws 41 extending through the walls of the hubs 35. The overall width of the mulching blade sets c is adjusted by loosening the set screws 41, arranging the disks 34 at the desired distance from each other and securing them in these positions by tightening the set screws again. By moving the end disks 34 of a blade set c toward or away from each other the blade halves are arranged at different angles to each other.

Having described my invention I claim as new and desire to secure by Letters Patent:

A mulching device, comprising a plurality of mulching sets carried upon a rotatable common shaft, said mulching sets being spaced along said shaft to straddle a series of crop rows, each said set being of sufficient length to span the width between adjacent crop rows and each including a plurality of blades secured to the peripheries of an inner and two outer disks, said inner disk having a larger diameter than said outer disks to dispose said blades at an oblique angle to said shaft, the peripheries of said disks being beveled and said blades being arranged to lie flat therealong so as to incline from the inner disk toward the outer disks, each said outer disk being adjustably mounted upon said shaft for movement relative thereto.

JOE SEVERANCE.

References Cited in the file of this patent

UNITED STATES PATENTS

| Number | Name | Date |
|---|---|---|
| 527,302 | Usry | Oct. 9, 1894 |
| 555,760 | Cobb | Mar. 3, 1896 |
| 719,898 | Spitzenburg | Feb. 3, 1903 |
| 1,225,547 | Willson | May 8, 1917 |
| 1,644,449 | Rodriquez | Oct. 4, 1927 |
| 1,760,882 | Morrow | June 3, 1930 |
| 1,836,666 | Katzfey | Dec. 15, 1931 |
| 1,843,095 | Urschell | Jan. 26, 1932 |
| 1,880,113 | Smith | Sept. 27, 1932 |
| 2,232,523 | Gray | Feb. 18, 1941 |
| 2,317,188 | Hanson | Apr. 20, 1943 |
| 2,364,043 | Ariens | Dec. 5, 1944 |